US009039381B2

(12) United States Patent
Grife et al.

(10) Patent No.: US 9,039,381 B2
(45) Date of Patent: May 26, 2015

(54) WIND TURBINE BLADE AND METHOD FOR MANUFACTURING A WIND TURBINE BLADE WITH VORTEX GENERATORS

(75) Inventors: Ronald Grife, Houston, TX (US); Carsten Hein Westergaard, Houston, TX (US); Joshua Bryant, Spring, TX (US); David Chao, Houston, TX (US); Kim Mittendorf, Katy, TX (US); Jou-Young Choi, Katy, TX (US); Abigail Arrington, Houston, TX (US)

(73) Assignee: Vestas Wind Systems A/S, Aarhus N. (DK)

( * ) Notice: Subject to any disclaimer, the term of this patent is extended or adjusted under 35 U.S.C. 154(b) by 498 days.

(21) Appl. No.: 13/313,609

(22) Filed: Dec. 7, 2011
(Under 37 CFR 1.47)

(65) Prior Publication Data
US 2012/0282105 A1 Nov. 8, 2012

Related U.S. Application Data

(60) Provisional application No. 61/424,265, filed on Dec. 17, 2010.

(30) Foreign Application Priority Data

Dec. 23, 2010 (DK) .................................. 2010 70584

(51) Int. Cl.
*B23P 15/04* (2006.01)
*B41B 11/52* (2006.01)
*F03D 1/06* (2006.01)

(52) U.S. Cl.
CPC ......... *F03D 1/0675* (2013.01); *Y10T 29/49337* (2015.01); *F05B 2240/122* (2013.01); *Y02E 10/721* (2013.01); *F05B 2240/30* (2013.01)

(58) Field of Classification Search
CPC ............ F03D 1/0675; Y10T 29/49337; F05B 2240/122; F05B 2240/30
USPC .......... 415/914; 416/228, 235, 236 R, 236 A, 416/237, 229 R, 229 A, 230; 244/200.1, 204, 244/99.12, 200, 123.1
See application file for complete search history.

(56) References Cited

U.S. PATENT DOCUMENTS 4,455,045 A 6/1984 Wheeler
4,655,419 A 4/1987 Van der Hoeven
(Continued)

FOREIGN PATENT DOCUMENTS

EP 1310351 A1 5/2003
EP 1 944 505 7/2008
(Continued)

OTHER PUBLICATIONS

Sanne H. Skovborg; 1st Technical Examination and Search Report issued in priority Denmark Application No. PA 2010 70584; Aug. 1, 2011; 6 pages; Denmark Patent and Trademark Office.
(Continued)

*Primary Examiner* — Dwayne J White
*Assistant Examiner* — Alexander White
(74) *Attorney, Agent, or Firm* — Wood, Herron & Evans, LLP

(57) ABSTRACT

A wind turbine for generating electrical energy may include a wind turbine blade including a plurality of vortex generators integrally formed in the outer surface of the blade. The vortex generator includes a first component that defines a portion of the outer surface of the blade and a second component defining the shape of the vortex generator and at least partially surrounded by the first component. A method of manufacturing the wind turbine blade includes disposing a first plurality of layers of structural material over a mold main body and a removable insert member with a shaped cavity. A shaped plug is then pressed into the shaped cavity, and a second plurality of layers of structural material is disposed over the plug and the mold main body to complete manufacture of a wind turbine blade with a vortex generator.

21 Claims, 9 Drawing Sheets

(56) References Cited

U.S. PATENT DOCUMENTS

| | | | |
|---|---|---|---|
| 5,058,837 A | | 10/1991 | Wheeler |
| 5,734,990 A | | 4/1998 | Waring |
| 5,887,280 A | | 3/1999 | Waring |
| 5,988,568 A | * | 11/1999 | Drews .......................... 244/200 |
| 6,131,853 A | * | 10/2000 | Bauer et al. ................... 244/113 |
| 6,264,877 B1 | | 7/2001 | Pallu De La Barriere |
| 6,276,636 B1 | | 8/2001 | Krastel |
| 7,255,549 B2 | | 8/2007 | Hadley |
| 2008/0175711 A1 | | 7/2008 | Godsk et al. |
| 2010/0207299 A1 | | 8/2010 | Sidhu et al. |

FOREIGN PATENT DOCUMENTS

| | | |
|---|---|---|
| EP | 2 031 241 | 3/2009 |
| EP | 2138714 A1 | 12/2009 |
| WO | 00/15961 | 3/2000 |
| WO | 2007140771 A1 | 12/2007 |
| WO | 2008/113350 | 9/2008 |
| WO | 2009/026926 | 3/2009 |
| WO | 2009/026927 | 3/2009 |
| WO | 2009/080316 | 7/2009 |

OTHER PUBLICATIONS

European Patent Office, European Search Report issued in corresponding application No. 11193600.1, dated Jun. 25, 2014, 8 pages.

* cited by examiner

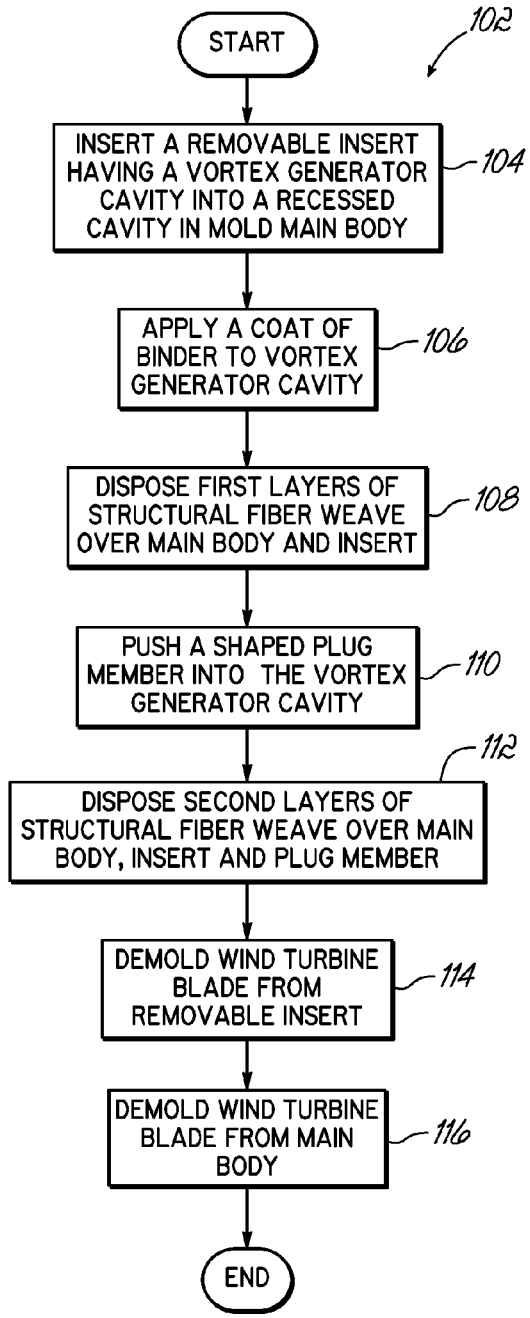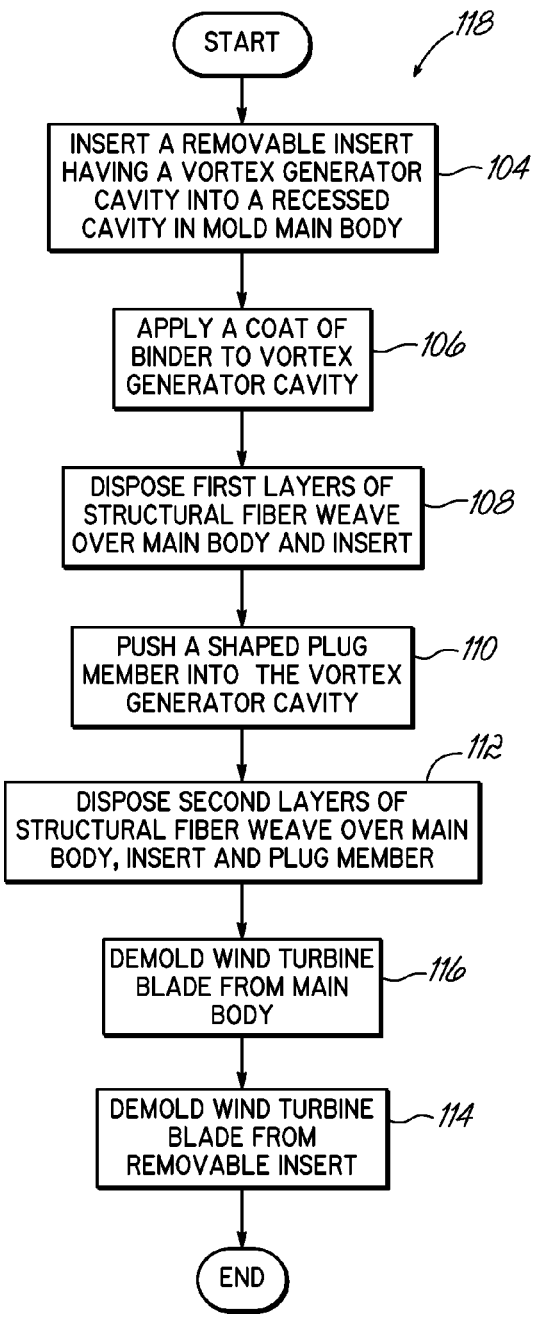
FIG. 14A
FIG. 14B

WIND TURBINE BLADE AND METHOD FOR MANUFACTURING A WIND TURBINE BLADE WITH VORTEX GENERATORS

CROSS-REFERENCE TO RELATED APPLICATION

This application claims priority under 35 U.S.C. §119(a) to Denmark Application No. PA 2010 70584, filed Dec. 23, 2010. This application also claims the benefit of U.S. Provisional Application No. 61/424,265, filed Dec. 17, 2010. Each of these applications is incorporated by reference herein in its entirety.

TECHNICAL FIELD

The invention relates generally to wind turbines, and more particularly, to a wind turbine blade and a method of manufacturing a wind turbine blade including integral vortex generators for modifying the flow of air around the blade.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower, a nacelle located at the apex of the tower, and a rotor having a plurality of blades and supported in the nacelle by means of a shaft. The shaft couples the rotor either directly or indirectly with a generator, which is housed inside the nacelle. Consequently, as wind forces the blades to rotate, electrical energy is produced by the generator.

Wind turbines are subject to high aerodynamic loads applied by the wind to the wind turbine blades, including reduced lift forces caused by the separation of air flow around the blade from the blade surface at a boundary layer. As well understood in fluid dynamics, the thickness of a boundary layer tends to increase away from the leading edge of a wind turbine blade. The increased thickness of the boundary layer tends to promote turbulent flow within the boundary layer and reduce the maximum lift coefficient of the wind turbine blade. Consequently, vortex generators are positioned within the boundary layer to create vortices downstream of the vortex generators. The flow vortices force increased mixing of air from the boundary layer and air outside the boundary layer, thereby delaying the boundary layer separation or the rapid increase of thickness in the boundary layer. In this regard, the boundary layer remains closer to the surface of the blade over an increased portion of the wind turbine blade. Therefore, the vortex generators increase the maximum lift coefficient of a wind turbine blade by delaying separation.

Conventional vortex generators for wind turbine blades are generally applied to a blade after the blade has been manufactured because the vortex generators are small features difficult to successfully demold from a 160-foot long (50 meters) or longer blade mold. The vortex generators are typically plate-shaped members composed of a plastic or metal material and adhesively coupled to the outer surface of a wind turbine blade using double-sided tape or similar adhesive materials. The vortex generators must be accurately positioned and then manually adhered on the blade, typically in a piecemeal manner. This individualized process increases the time and cost for producing a wind turbine blade. Furthermore, the affixed vortex generators may be damaged in shipping or from repeated extreme weather conditions.

Thus, there remains a need for an improved molding apparatus and method for manufacturing the wind turbine blades and the vortex generators that address these and other shortcomings in conventional wind turbine manufacturing processes and conventional vortex generators.

SUMMARY

According to one embodiment, a wind turbine blade includes an outer surface and a plurality of vortex generators formed in the outer surface. The vortex generators include a first component defining a portion of the outer surface of the blade and a second component defining the shape of the vortex generator. The second component is at least partially surrounded by the first component. The first component may be composed of a first material, while the second component may be composed of a second material different than the first material.

According to another embodiment, a wind turbine includes a tower, a nacelle located adjacent a top of the tower, and a rotor. The rotor includes a hub and a plurality of blades extending from the hub. At least one of the blades is configured with an outer surface and a plurality of vortex generators as described above.

In another embodiment, a molding apparatus for a wind turbine blade includes a mold main body including a defining surface and at least one recessed cavity. The defining surface is shaped to define the outer surface of the wind turbine blade. The molding apparatus also includes an insert member removably inserted into the at least one recessed cavity. The insert member includes an inner surface defining a vortex generator cavity that opens to the defining surface of the mold main body. The vortex generator cavity is shaped to define a first integral vortex generator on the wind turbine blade. The molding apparatus may include a second insert member having a second vortex generator cavity configured to define a second vortex generator on the wind turbine blade having a different shape.

In an exemplary embodiment, a method of manufacturing a wind turbine blade having at least one vortex generator includes inserting a first removable insert member with a first vortex generator cavity into a recessed cavity of a mold main body. The method further includes disposing a first plurality of layers of structural material over the mold main body and the first removable insert member, and pushing a shaped plug into the first vortex generator cavity to thereby push the first plurality of layers of structural material into the first vortex generator cavity. A second plurality of layers of structural material is then disposed over the mold main body, the first removable insert member, and the shaped plug to form a wind turbine blade with an integral vortex generator. Then the wind turbine blade and the integral vortex generator are demolded from the mold main body and the first removable insert.

The wind turbine blade may be demolded prior to, simultaneous to, or after the demolding of the first removable insert member. In another embodiment, a wind turbine blade including at least one vortex generator is formed by the method of manufacturing a wind turbine blade described above.

BRIEF DESCRIPTION OF THE DRAWINGS

The accompanying drawings, which are incorporated in and constitute a part of this specification, illustrate an embodiment of the invention and, together with a general description of the invention given above, and the detailed description given below, serve to explain the invention.

FIG. 14A is a schematic flowchart illustrating the manufacture of a wind turbine blade including the demolding process of FIGS. 11A-11C;

FIG. 14B is a schematic flowchart illustrating the manufacture of a wind turbine blade including the demolding process of FIGS. 12A-12B;

DETAILED DESCRIPTION

Figure 1:
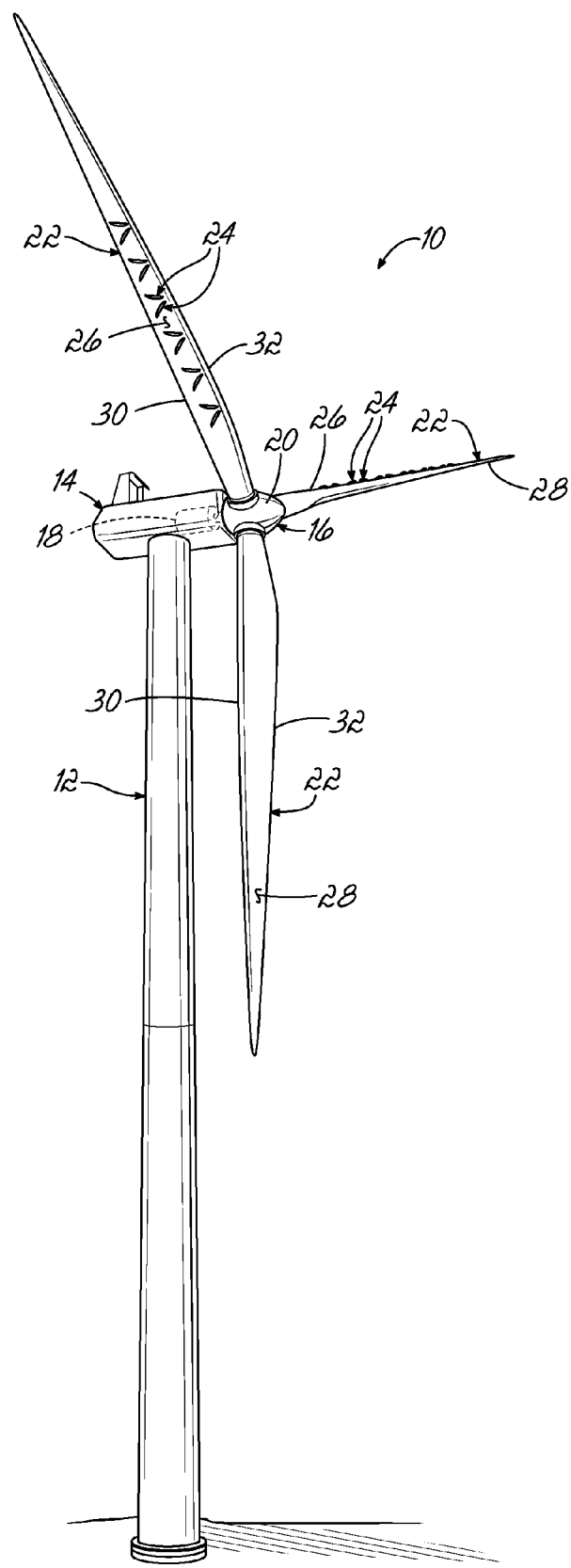
FIG. 1 is a perspective view of a wind turbine.

With reference to FIG. 1, a wind turbine 10 includes a tower 12, a nacelle 14 disposed at the apex of the tower 12, and a rotor 16 operatively coupled to a generator 18 housed inside the nacelle 14. In addition to the generator 18, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14 and also operates to elevate the nacelle 14 and rotor 16 to a height above ground level or sea level, as may be the case, at which faster moving air currents of lower turbulence are typically found.

The rotor 16 of the wind turbine 10, which is represented as a horizontal-axis wind turbine, serves as the prime mover for the electromechanical system. Wind exceeding a minimum level will activate the rotor 16 and cause rotation in a substantially perpendicular direction to the wind direction. The rotor 16 of wind turbine 10 includes a central hub 20 and a plurality of blades 22 that project outwardly from the central hub 20 at locations circumferentially distributed thereabout. In the representative embodiment, the rotor 16 includes three blades 22, but the number may vary. The wind turbine blades 22 are configured to interact with the passing air flow to produce lift that causes the rotor 16 to spin generally within a plane defined by the blades 22.

The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator 18 to the power grid as known to a person having ordinary skill in the art.

In order to increase the lift generated by air flowing over the blades 22 and mitigate blade stall, the blades 22 are designed and constructed with a plurality of integral vortex generators 24 typically positioned along a suction side 26 of the blade 22. Although only one spanwise row of integral vortex generators 24 is illustrated along the suction side 26 in the figures, the wind turbine blades 22 may include multiple spanwise rows of integral vortex generators 24 along the suction side 26 or on the pressure side 28 of the blades 22 in alternative embodiments. As well understood in fluid dynamics, air flowing over the wind turbine blade 22 forms a boundary layer that may separate from the outer surface of the blade 22 between a leading edge 30 of the blade 22 and a trailing edge 32 of the blade 22, depending on air speed, wing geometry (e.g., angle of attack), or other factors. The integral vortex generators 24 delay the separation of this boundary layer from the blade outer surface by causing flow vortices to mix air flow above the boundary layer with air flow in the boundary layer. As a result, the integral vortex generators 24 increase the maximum lift coefficient of a wind turbine blade 22 with minimal added drag and noise production, which results in increased blade rotation velocity and more power generation.

FIGS. 2-5B further illustrate one embodiment of the wind turbine blade 22 including integral vortex generators 24. Each vortex generator 24 generally defines a three-dimensional prism-type shape rather than a flat plate, which advantageously provides more robust structure while enabling a molding process to manufacture the wind turbine blade 22, as described in further detail below. In the exemplary embodiment illustrated, the three-dimensional shape of the vortex generator 24 is a triangular prism. However, the specific three-dimensional shape of each vortex generator 24 may be modified in alternative embodiments of the invention to optimize one or more of the following: increased lift generation, mitigated stall, reduced noise production, and reduced drag.

In the illustrated embodiment, each vortex generator 24 is formed integrally with the outer surface 34 of the wind turbine blade 22 and extends upwardly from the outer surface 34. Each vortex generator 24 includes an upstream surface 36, a downstream surface 38, and a top edge 40 at the junction of the upstream surface 36 and the downstream surface 38. The upstream surface 36 of each vortex generator 24 is generally perpendicular to the outer surface 34 of the blade 22. Thus, the upstream surface 36 presents a plate-like flow obstruction facing the leading edge 30 of the blade 22. The upstream surface 36 produces flow vortices in a similar fashion as conventional plate-like vortex generators. The flow vortices extend downstream from the top edge 40 and force mixture of flow between a boundary layer close to the outer surface 34 of the blade 22 and air flowing above the boundary layer. The downstream surface 38 of each vortex generator 24 is angled from the upstream surface 36 of the vortex generator 24 and the outer surface 34 of the blade 22 to present a smooth contour facing the trailing edge 32 of the blade 22.

Figure 2:
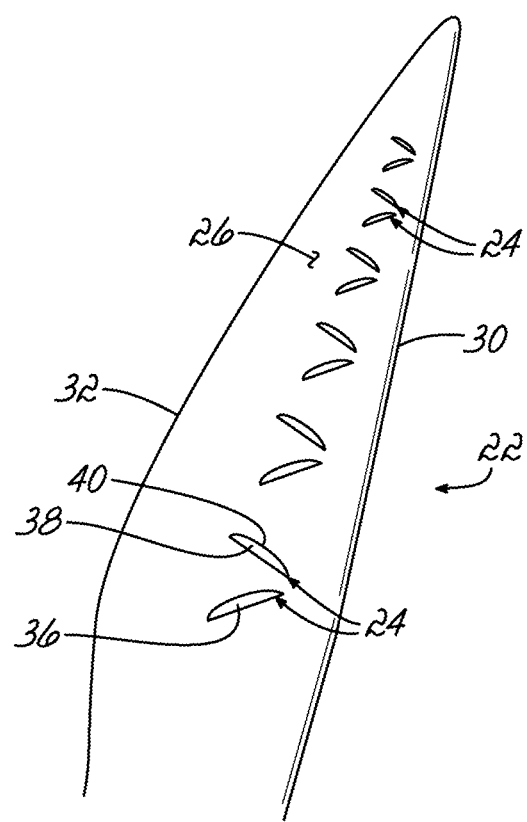
FIG. 2 is a perspective view of a portion of a wind turbine blade including integral vortex generators according to one embodiment.
Figure 3:
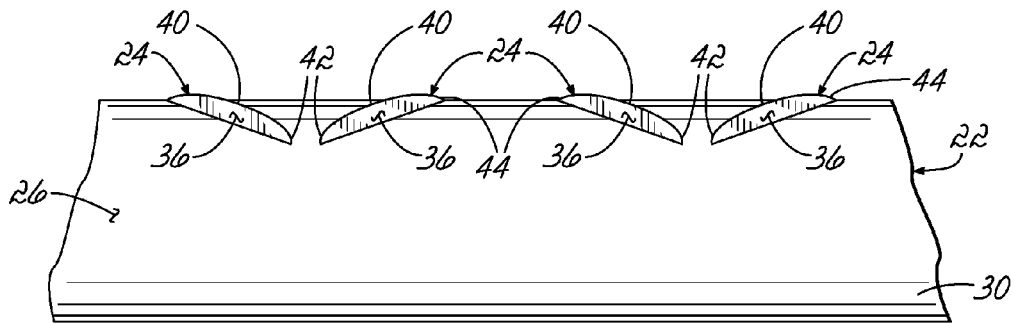
FIG. 3 is a front view of the wind turbine blade of FIG. 2.
Figure 4:
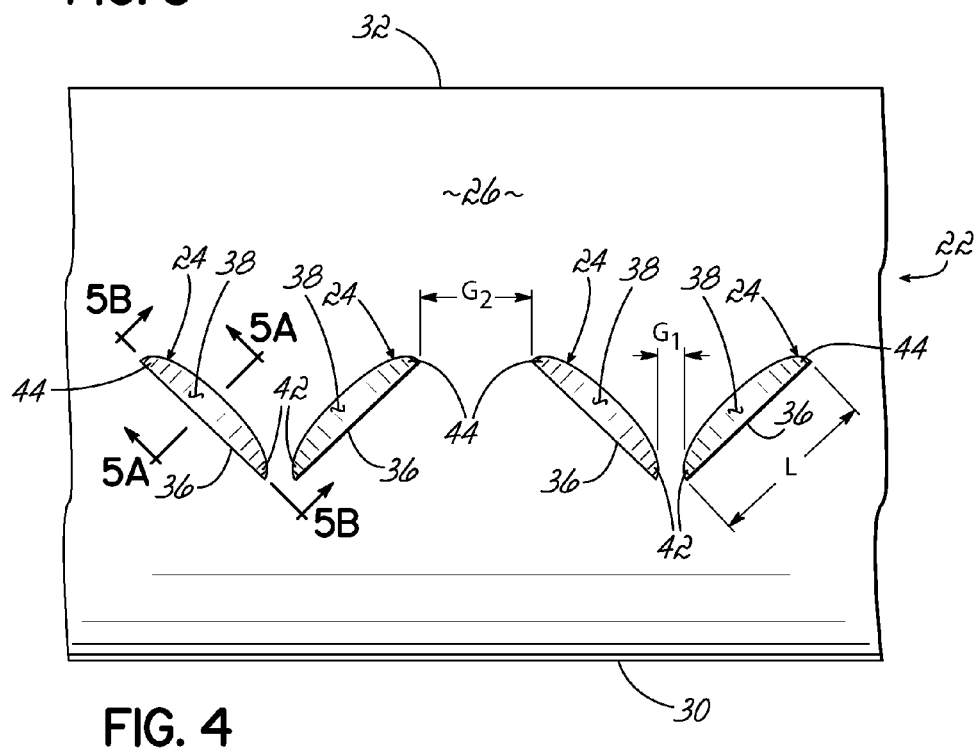
FIG. 4 is a top view of the wind turbine blade of FIG. 2.

As shown most clearly in FIGS. 2-4, the plurality of vortex generators 24 are arranged in pairs along a length of the blade 22. Each pair of vortex generators 24 are angled from each other such that the pair is arranged in a V-shaped configuration. In this regard, each of the vortex generators 24 includes an upstream end 42 directed generally toward the other vortex generator 24 in the pair of vortex generators and also toward the leading edge 30 of the blade 22. Similarly, each of the vortex generators 24 includes a downstream end 44 directed generally away from the other vortex generator 24 in the pair of vortex generators 24 and also toward the trailing edge 32 of the blade 22. Each vortex generator 24 defines a longitudinal length L from the upstream end 42 to the downstream end 44. In an exemplary embodiment, the length L may be about 1% to 5% of the chord length of the blade 22 measured locally to the vortex generator 24. The length L may also be scaled in accordance with the local boundary layer thickness so as to be a set percentage thereof. In the illustrated embodiment, the vortex generators 24 in each pair of vortex generators 24 are angled from one another at the respective upstream ends 42 by approximately 90 degrees, but it will be appreciated that this angle between the vortex generators 24 may be modified to optimize the performance of the wind turbine 10.

A first gap distance $G_1$ is defined between the upstream ends 42 of two vortex generators 24 in any pair of vortex generators 24 while a second gap distance $G_2$ is defined between the downstream ends 44 of adjacent pairs of vortex generators 24. In the exemplary embodiment, gap distance $G_1$ is shorter than gap distance $G_2$, although the respective lengths of gap distances $G_1$ and $G_2$ may be modified for various applications within the scope of the invention. Additionally, as most readily seen in FIG. 5A, each vortex generator 24 defines a height H and a width W along a central cross section through the vortex generator 24. In one example, the ratio of the height H to the width W is greater than or equal to 1 (i.e., $H/W \geq 1$). More specifically, the height H may be about 0.5% to 1% of the chord length of the blade 22 measured locally to the vortex generator and the width W may be about 0.5% to 1% of the chord length of the blade 22 measured locally to the vortex generator in one embodiment. The ratio of the height H to the width W may be further modified for various applications of a vortex generator 24 according to the invention.

Figure 5A:
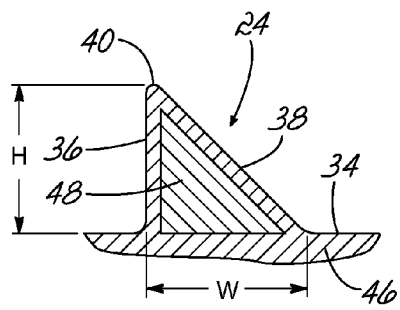
FIG. 5A is a cross-sectional side view of one of the integral vortex generators taken along line 5A-5A in FIG. 4.
Figure 5B:
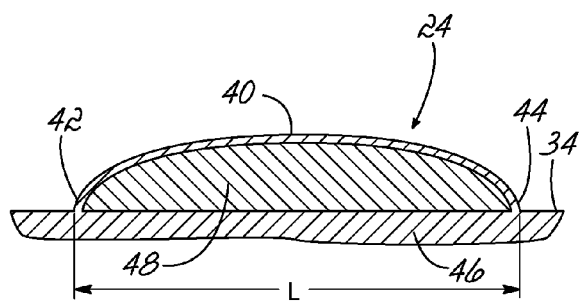
FIG. 5B is a cross-sectional side view of one of the integral vortex generators taken along line 5B-5B in FIG. 4.

The vortex generators 24 are more clearly illustrated in the cross-sectional views of FIGS. 5A and 5B. As readily understood from these figures, each vortex generator 24 is molded into the blade 22 integrally and includes an outer first component 46 and an inner second component 48. More specifically, the first component 46 may be the material used to form the contoured outer surface 34 of the blade 22, while the second component 48 may be a plug member 48 at least partially surrounded or alternatively completely encased by the first component 46. To this end, the plug member generally defines the shape of the vortex generator 24, which in the illustrated embodiment, is a triangular prism with tapered upstream and downstream ends 42, 44. The first component 46 provides structural robustness and strength by integrally forming the vortex generator 24 as a continuous part of the outer surface 34 of the blade 22. In the exemplary embodiment, the first component 46 includes a structural material such as structural fiber weave and a binder, as well understood in the blade manufacturing art, and the plug member 48 includes injection molded plastic material. More particularly, the structural fiber weave may include fiberglass or another fiber-reinforced plastic material, and the binder may include an epoxy resin, a polyester-based resin, or other resins. Thus, the vortex generator 24 does not add significant weight to the wind turbine blade 22, but the plastic material of the plug member 48 is protected by the fiberglass weave from degradation and failure caused by ultraviolet radiation. Therefore, the two-component construction of the vortex generator 24 produces a robust integral member that is not subject to the normal failure modes of conventional vortex generators and is readily manufactured using the method described in further detail below.

According to one conventional process, a wind turbine blade is manufactured by disposing, for example by rolling out, structural outer shell material into two half-molds and then injecting a binder, such as an epoxy resin, polyester resin, or other suitable material around the structural outer shell material while a vacuum bag presses the structural outer shell material into each half-mold. In an alternate process, pre-impregnated composite material may be used which precludes injecting the material with a binder. After curing the binder about the structural outer shell material (e.g., a fiberglass weave) and demolding the outer shell from the mold, the two halves of the wind turbine blade outer shell are coupled to one another around a structural support member or spar. The two halves of the wind turbine blade are typically coupled by adhesive material, thereby completing blade construction. Consequently, the following description will focus on the manufacture of one-half of the wind turbine blade 22, and more particularly, the suction side 26 of the wind turbine blade 22 between the leading edge 30 and the trailing edge 32. It will be understood that the following method and molding apparatus could be used to form the other half of the wind turbine blade 22 (i.e., the pressure side 28) without departing from the scope of the invention.

Figure 6:
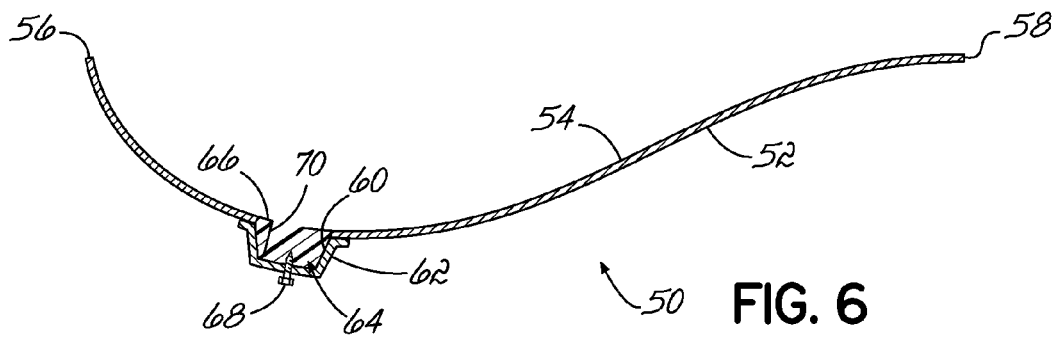
FIG. 6 is a cross-sectional side view of a molding apparatus used to manufacture the wind turbine blade of FIG. 2.
Figure 7:
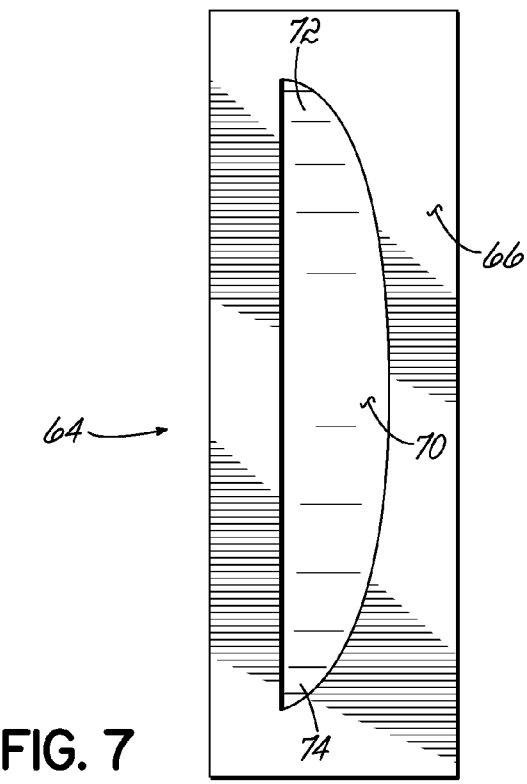
FIG. 7 is a bottom view of the insert of the molding apparatus of FIG. 6.

FIGS. 6 and 7 illustrate an exemplary embodiment of a molding apparatus 50 used to manufacture the outer shell of the wind turbine blade 22 with one or more integral vortex generators 24. As shown in FIG. 6, the molding apparatus 50 includes a mold main body 52 having a defining surface 54 along an interior side generally corresponding to a negative of the contoured outer surface 34 of a completed wind turbine blade 22. In this regard, the mold main body 52 bulges outwardly between a first end 56 corresponding to the leading edge 30 of the finished blade 22 and a second end 58 corresponding to the trailing edge 32 of the finished blade 22. The mold main body 52 further includes at least one recessed cavity 60 between the first end 56 and the second end 58 and defined by a receptacle 62 coupled to the mold main body 52. The receptacle 62 may be integrally formed with the mold main body 52, or the receptacle 62 may be removably coupled to the mold main body 52 by any known fastener. The recessed cavity 60 breaks the continuity of the defining surface 54. The mold main body 52 and the receptacle 62 may be composed of fiberglass reinforced with a steel frame (not shown) as well understood in the art.

The molding apparatus 50 further includes a removable insert member 64 configured to be inserted into the recessed cavity 60 of the receptacle 62. The insert member 64 includes an inner surface 66 configured to be disposed generally coplanar with the defining surface 54 of the mold main body 52. More specifically, the inner surface 66 of the insert member 64 and the defining surface 54 of the mold main body 52 are configured to collectively form a continuous molding surface for the molding apparatus 50. The insert member 64 is removably coupled to the receptacle 62 with a fastener 68 such as a threaded bolt or screw. It will be understood that any type of fastener 68 may be used to couple the insert member 64 and the mold main body 52 in alternative embodiments.

The insert member 64 shown in FIGS. 6 and 7 further includes a shaped vortex generator cavity 70 adapted to be the negative of the integral vortex generator 24 previously described. The vortex generator cavity 70 is configured to open to the defining surface 54 of the mold main body 52. To this end, the vortex generator cavity 70 defines a three-dimensional shape such as a triangular prism with tapered first and second ends 72, 74 corresponding, respectively, to the upstream end 42 and the downstream end 44 of the integral vortex generator 24. It will be understood that the vortex generator cavity 70 may define different shapes for the vortex generator in alternative embodiments of the invention (one of which is described in further detail with reference to FIG. 15A below). Thus, the insert member 64 may be removed and replaced with other inserts having various vortex generator cavity shapes to optimize production of different wind turbine blades 22 using the same molding apparatus 50. Furthermore, the insert member 64 may be replaced if the insert member 64 wears out quicker than the corresponding mold main body 52.

The insert member 64 may be composed of various "hard" or "soft" mold materials depending upon the particular application and vortex generator 24 to be formed. For example, the insert member 64 may be composed of silicone in some embodiments where the wind turbine blade 22 and the vortex generators 24 are to be demolded individually. In this regard, demolding the mold main body 52 from a 10-ton wind turbine blade 22 may cause localized stress or bending forces strong enough to deform or break the integral vortex generator 24 from the blade 22. These risks are lessened by the separate demolding of the insert member 64 from the vortex generator 24. A silicone insert member 64 may also be used where the integral vortex generator 24 to be formed has intricate contours and features that are difficult to successfully demold. On the other hand, the insert member 64 may alternatively be composed of a tooling material such as fiberglass, plastic, or aluminum in embodiments where the integral vortex generator 24 defines less sophisticated (e.g., rounded and shallow) shapes. Regardless of the material used for the insert member 64, the demolding of the wind turbine blade 22 and the vortex generators 24 may also be conducted simultaneously within the scope of the invention. Other materials may also be used for the insert member 64 in alternative non-illustrated embodiments.

A first embodiment of a method for manufacturing a wind turbine blade 22 having an integral vortex generator 24 as previously described is illustrated in FIGS. 8-11C. The molding apparatus 50 previously described is first prepared for the manufacturing process. To this end, the removable insert member 64 with the desired vortex generator cavity 70 is inserted into the receptacle 62 at the recessed cavity 60 of the mold main body 52. The insert member 64 is fastened to the receptacle 62 with the fastener 68. A preliminary coat of binder material may then be applied locally to the vortex generator cavity 70. Alternatively, the preliminary coat of binder material may be applied to the entire mold main body 52 and insert member 64, including the vortex generator cavity 70. The molding apparatus 50 is then configured as shown in FIG. 6 and is ready for the molding process.

Figure 8:
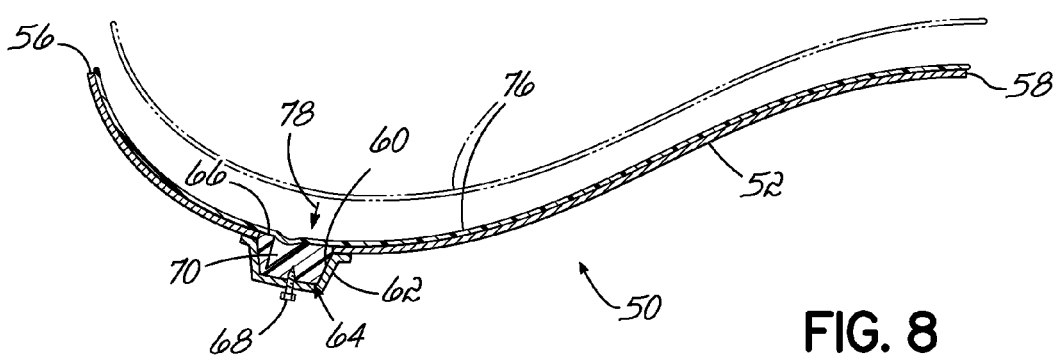
FIG. 8 is a cross-sectional side view of the molding apparatus of FIG. 6 after a first application of a structural fiber weave.

As shown in FIG. 8, a first plurality of layers 76 (shown as a single layer for simplicity in FIG. 8) of structural material such as a structural fiber weave is disposed or rolled over the mold main body 52 and the insert member 64 as indicated by arrow 78. As well understood in the wind turbine art, the structural fiber weave may include fiberglass or another fiber-reinforced plastic material applied by rolling continuous sheets of fiberglass material over the defining surface 54 and the inner surface 66 of the insert member 64. Furthermore, the structural fiber weave may include a composite material pre-impregnated with binder material. The first plurality of layers 76 of structural fiber weave will define the outer surface 34 of the finished wind turbine blade 22. Also as shown in FIG. 8, the first plurality of layers 76 of structural fiber weave does not naturally sink completely into the vortex generator cavity 70 of the insert member 64, but the first plurality of layers 76 of structural fiber weave may sag slightly into the vortex generator cavity 70. In embodiments where the binder was pre-applied to the entire mold main body 52 and the insert member 64, the structural fiber weave is effectively pushed into the binder to begin forming a continuous sidewall or outer shell of the wind turbine blade 22.

Figure 9:
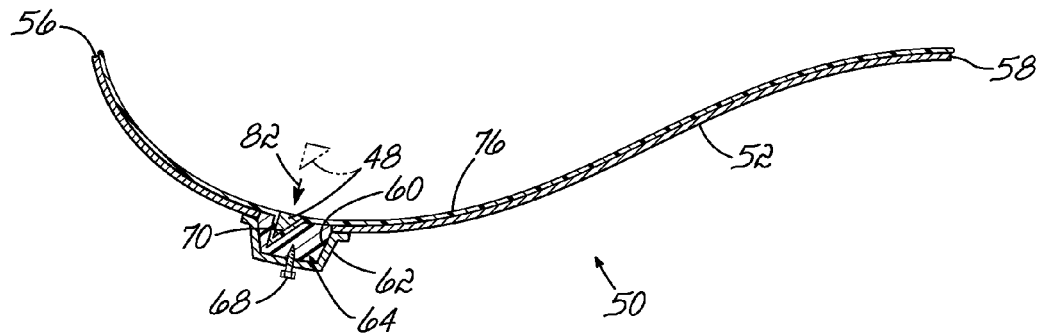
FIG. 9 is a cross-sectional side view of the molding apparatus of FIG. 6 after a vortex generator plug has been inserted.

As shown in FIG. 9, the shaped plug member 48 is then pushed into the vortex generator cavity 70 as indicated by arrow 82. In this regard, the shaped plug member 48 forces the first plurality of layers 76 of structural fiber weave fully into the vortex generator cavity 70 and the binder material sprayed into the vortex generator cavity 70. The plug member 48 is shaped similarly to the vortex generator cavity 70 such that the plug member 48 and the first plurality of layers 76 of structural fiber weave substantially fill the vortex generator cavity 70. Thus, the plug member 48 and the first plurality of layers 76 of structural fiber weave form a substantially continuous surface facing inwardly from the molding apparatus 50. In one exemplary embodiment, a plurality of plug members 48 are contained in a roll such that a single plug member 48 may be "rolled" into the vortex generator cavity 70 by a similar manner as the rolling of the structural fiber weave. It will be appreciated that alternative methods of pushing the plug member 48 such as manual application may be used in alternative embodiments of the invention.

Figure 10:
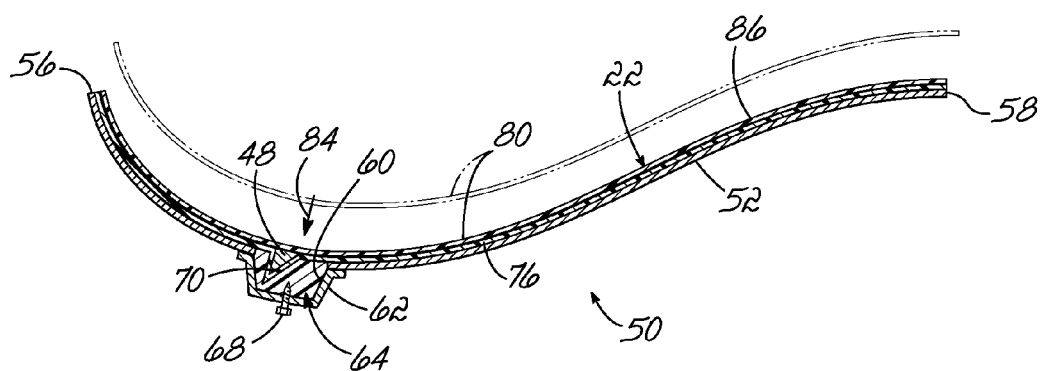
FIG. 10 is a cross-sectional side view of the molding apparatus of FIG. 6 after a second application of the structural fiber weave.

After the shaped plug member 48 is pushed into the vortex generator cavity 70, a second plurality of layers 80 of structural material such as structural fiber weave (e.g., fiberglass material) is disposed, such as by being rolled, over the first plurality of layers 76 of structural fiber weave and the plug member 48, as shown in FIG. 10 and indicated by arrow 84. To this end, the second plurality of layers 80 of structural fiber weave is effectively rolled over each of the mold main body 52, the insert member 64, and the plug member 48. Another coat of binder may be applied to the first plurality of layers 76 of structural fiber weave and the plug member 48 prior to rolling the second plurality of layers 80 of structural fiber weave in some embodiments, but this coat of binder may not be required. In the previously mentioned alternative embodiment with pre-impregnated composite material, no additional coat of binder may be required. The second plurality of layers 80 of structural fiber weave will define an interior surface 86 of the outer shell of the finished wind turbine blade 22. Furthermore, the second plurality of layers 80 of structural fiber weave complete the encasing or surrounding of the plug member 48 to form the two-component vortex generator 24.

After the second plurality of layers 80 of structural fiber weave is rolled into position, the wind turbine blade 22 is finished using well-known injection and curing steps. For example, a vacuum bag may be inflated to fill the area beneath the second plurality of layers 80 of structural fiber weave, and then additional binder material may be injected throughout the first and second pluralities of layers 76, 80 to thoroughly coat and surround the structural fiber weave. The binder and structural fiber weave combination may then be cured by heating to solidify the outer shell of the wind turbine blade 22 and the first component of the previously-described vortex generator 24. Alternatively as discussed above, the structural fiber weave may be pre-impregnated with binder material such that no injection step is required prior to curing the wind turbine blade 22. In still other alternative embodiments, the binder may include fillers or may be replaced with other binder materials such as a polyester-based resin within the scope of the invention. In sum, the injection and/or curing steps solidify the wind turbine blade 22 within the molding apparatus 50.

Figure 11A:
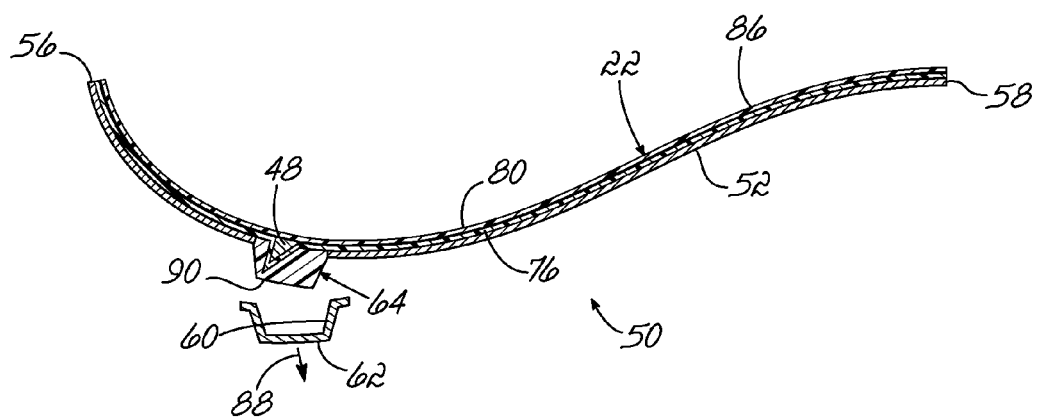
FIG. 11A is a cross-sectional side view of the molding apparatus of FIG. 6 during a first demolding step according to one embodiment of the invention.
Figure 11B:
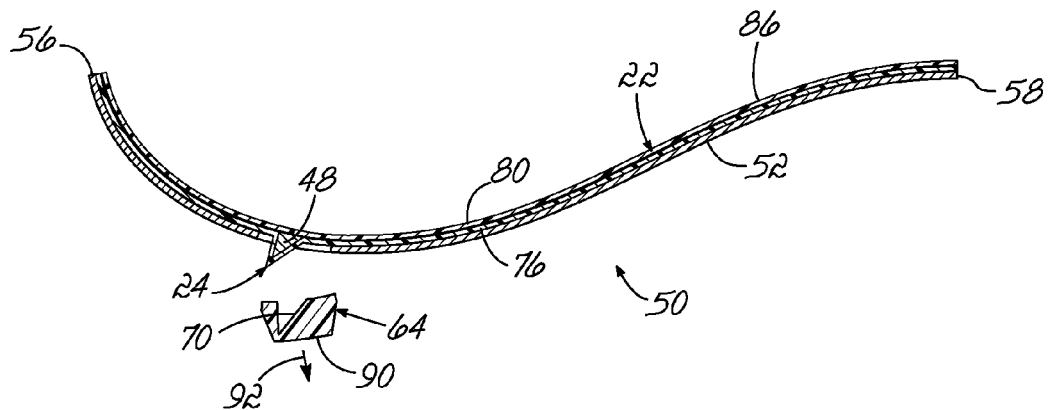
FIG. 11B is a cross-sectional side view of the molding apparatus of FIG. 6 during a second demolding step according to the embodiment of FIG. 11A.
Figure 11C:
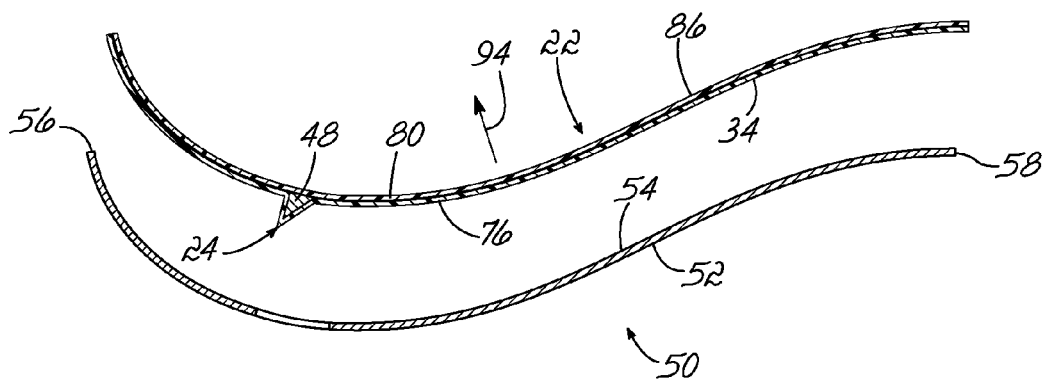
FIG. 11C is a cross-sectional side view of the molding apparatus of FIG. 6 during a third demolding step according to the embodiment of FIG. 11A.

The wind turbine blade 22 and integral vortex generator 24 must then be demolded from the main mold body 52 and the insert member 64, respectively. FIGS. 11A-11C illustrate the plurality of steps involved in this demolding according to the first embodiment of the method. As shown in FIG. 11A, the fastener 68 is removed from engagement with the receptacle 62 and the insert member 64 so that the receptacle 62 can be removed from the insert member 64 and the mold main body 52 in the direction of arrow 88. Removing the receptacle 62 exposes a back side 90 of the insert member 64 to provide access for removing the insert member 64. The integral vortex generator 24 is then demolded from the insert member 64 as shown by arrow 92 in FIG. 11B. For example, the insert member 64 may be manually peeled in a gradual manner from the vortex generator 24 to ensure that the vortex generator 24 is not damaged in the demolding process. After the vortex generator 24 is demolded, the blade 22 is demolded from the mold main body 52 as shown by arrow 94 in FIG. 11C. As discussed previously, the separate demolding of the vortex generator 24 and the blade 22 protects the vortex generator 24 from receiving the large forces sometimes applied to the blade 22 during the demolding process. Even in embodiments with highly sophisticated vortex generator shapes, the first embodiment of the method is configured to reliably demold both the vortex generator 24 and the blade 22 because the vortex generator 24 is subjected to localized manual or mechanical forces when peeling the insert member 64. After demolding, the wind turbine blade 22 with integral vortex generators 24 is ready for final preparation, curing, and installation as well understood in the art. Furthermore, the wind turbine blade 22 may include a first plurality of vortex generators formed in a first spanwise row and a second plurality of vortex generators formed in a second spanwise row.

Figure 12A:
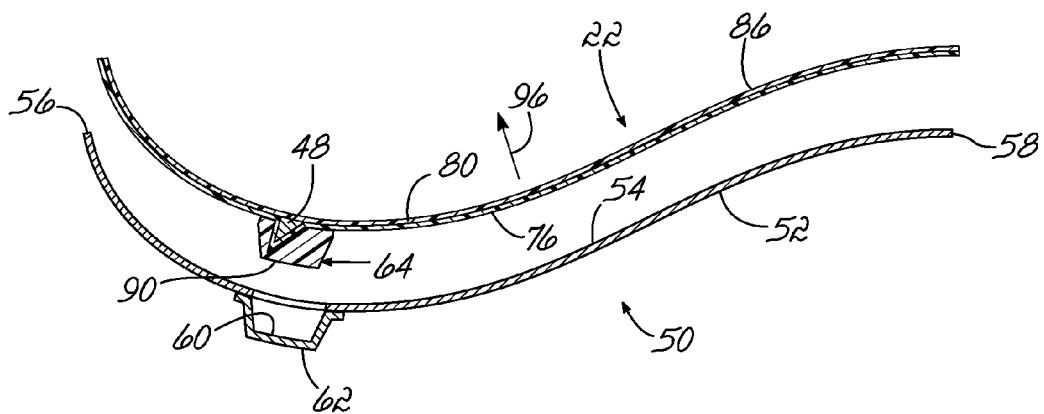
FIG. 12A is a cross-sectional side view of the molding apparatus of FIG. 6 during a first demolding step according to another embodiment of the invention.
Figure 12B:
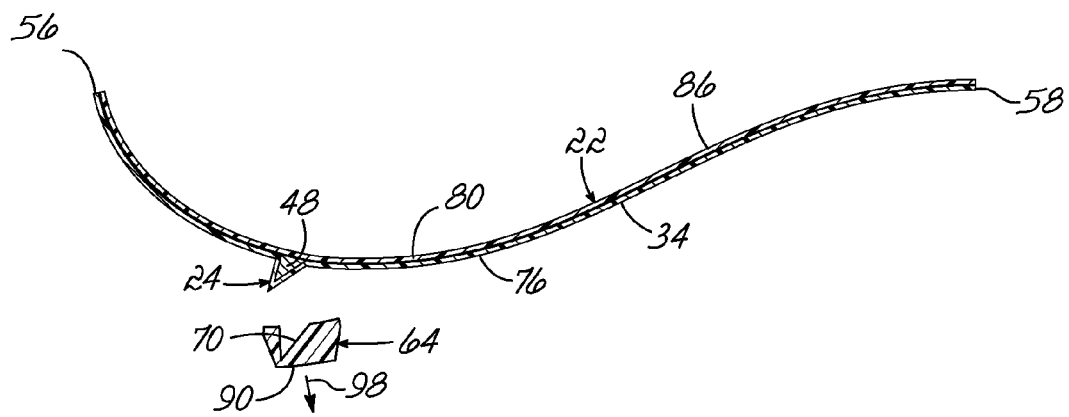
FIG. 12B is a cross-sectional side view of the molding apparatus of FIG. 6 during a second demolding step according to the embodiment of FIG. 12A.

A second embodiment of the method of manufacturing a wind turbine blade 22 having at least one vortex generator 24 is illustrated in FIGS. 8-10 and 12A-12B. Like the first embodiment, the blade 22 and vortex generator 24 are formed by disposing or rolling the first plurality of layers 76 of structural fiber weave over the molding apparatus 50, then pushing the plug member 48 into the vortex generator cavity 70 of the insert member 64, and then disposing or rolling the second plurality of layers 80 of structural fiber weave over the molding apparatus 50. However, the demolding process for the blade 22 and the integral vortex generators 24 is modified as shown in FIGS. 12A and 12B.

In this embodiment, the fastener 68 coupling the insert member 64 and the receptacle 62 is removed. Then the wind turbine blade 22 is demolded from the main mold body 52 by removing the main mold body 52 and receptacle 62 from the blade 22 in the direction of arrow 96 in FIG. 12A, leaving the insert member 64 on the vortex generator 24. In this manner, any of the large forces that may be applied during the demolding of the blade 22 are primarily affecting the insert member 64 rather than the vortex generator 24. As with the previous embodiment, the removal of the receptacle 62 provides access to the back side 90 of the insert member 64. The vortex generator 24 is then demolded from the insert member 64 by manually or mechanically peeling the insert member 64 from the vortex generator 24 as shown by arrow 98 in FIG. 12B. The blade 22 and the vortex generators 24 are reliably removed from the molding apparatus 50 without damaging the vortex generators 24 using this second embodiment of the method. After demolding, the wind turbine blade 22 with integral vortex generators 24 is ready for final preparation, curing, and installation as well understood in the art.

Figure 13:
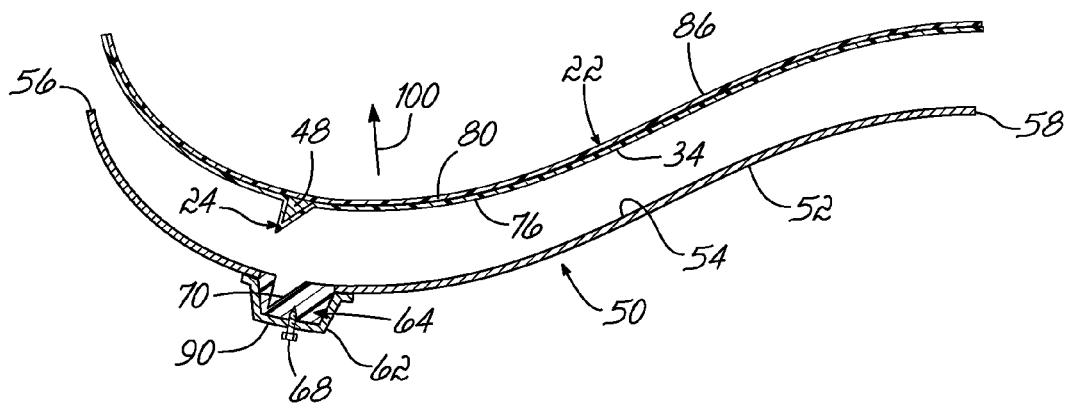
FIG. 13 is a cross-sectional side view of the molding apparatus of FIG. 6 during a demolding step according to yet another embodiment of the invention.

A third embodiment of the method of manufacturing a wind turbine blade 22 having at least one vortex generator 24 is illustrated in FIGS. 8-10 and 13. Again, the blade 22 and vortex generator 24 are formed by disposing or rolling the first plurality of layers 76 of structural fiber weave over the molding apparatus 50, then pushing the plug member 48 into the vortex generator cavity 70 of the insert member 64, and then disposing or rolling the second plurality of layers 80 of structural fiber weave over the molding apparatus 50, as previously described with respect to the first embodiment. In this embodiment, the demolding of the wind turbine blade 22 and the vortex generator 24 from the mold main body 52 and the insert member 64 is conducted simultaneously. In this regard, FIG. 13 illustrates that the fastener 68 remains coupled to the receptacle 62 and the insert member 64 such that the entire molding apparatus 50 is demolded in one motion indicated by arrow 100. This one-step demolding process is advantageous as long as no damage is incurred by the vortex generators 24 during the demolding process. As such, the third embodiment of the method may be ideal for wind turbine blades 22 having less sophisticated (i.e., rounded and shallow) vortex generators 24. However, the one-step demolding process may be used with any type of vortex generator 24 formed on the blade 22 in alternative embodiments.

FIGS. 14A and 14B summarize in flowchart form the previously-detailed first and second embodiments of the method for manufacturing a wind turbine blade 22 having at least one vortex generator 24. To this end, the first embodiment of the method 102 shown in FIG. 14A includes inserting the removable insert member 64 having a shaped vortex generator cavity 70 into the recessed cavity 60 of the mold main body 52, at step 104. A coat of binder may be applied to the vortex generator cavity 70 at step 106. The first plurality of layers 76 of structural fiber weave is disposed over the mold main body 52 and the insert member 64 at step 108. The shaped plug member 48 is pushed or forced into the vortex generator cavity 70 at step 110. The second plurality of layers 80 of structural fiber weave is disposed over the mold main body 52, the insert member 64, and the plug member 48 at step 112. The insert member 64 is then demolded from the wind turbine blade 22 (and more specifically, the vortex generator 24) at step 114. Finally, the wind turbine blade 22 is demolded from the main mold body 52 at step 116. Further explanation of these method steps are provided with reference to FIGS. 8-11C, above.

FIG. 14B illustrates the second embodiment of the method 118, which includes each of the same steps 104, 106, 108, 110, 112, 114, 116 as the previous method. The one difference in the second embodiment of the method 118 is that the wind turbine blade 22 is demolded from the main mold body 52 (step 116) before the insert member 64 is demolded from the wind turbine blade 22 and the vortex generator 24 (step 114). Thus, further details regarding these method steps are provided with reference to FIGS. 8-10 and 12A-12B, above.

With any embodiments of the method, the wind turbine blade 22 is easily formed with integral vortex generators 24 that reliably demold from a molding apparatus 50 without damaging the blade 22 or the vortex generators 24. As previously discussed, the number of spanwise rows of vortex generators 24 and the size and shape of the vortex generators 24 may be modified without departing from the scope of the invention. In this regard, while only one vortex generator 24 is shown in cross section in the illustrated embodiments, the demolding process of the blade 22 simultaneously or individually demolds a series of vortex generators 24 along with the blade 22. Consequently, each of the embodiments of the method are operable to manufacture the wind turbine blade 22 shown in FIGS. 2-5B with robust integral vortex generators 24 that minimize ultraviolet radiation degradation and other types of vortex generator failure commonly encountered with conventional vortex generators.

As previously discussed, different integral vortex generator 24 designs may be used in different applications of a wind turbine blade 22. To this end, the shape and size of the vortex generator 24 (including the length L, the height H, the width W, the first gap distance $G_1$, and the second gap distance $G_2$) may be modified to cause optimal changes in noise generation, drag generation, lift coefficient increase, and other aerodynamic factors. The molding apparatus 50 and associated manufacturing methods of the invention advantageously permit the ready modification of the formed vortex generators 24 for different applications by modifying the insert member 64 of the previously described embodiments.

Figure 15A:
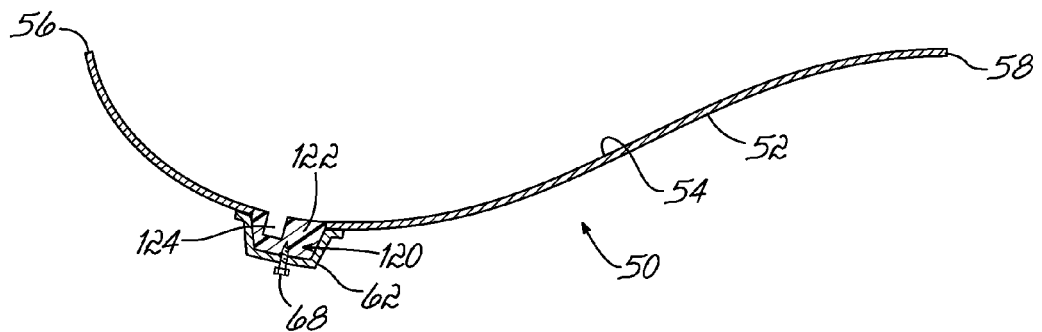
FIG. 15A is a cross-sectional side view of another embodiment of a molding apparatus used to manufacture a wind turbine blade according to the invention.

For example, FIG. 15A illustrates the molding apparatus 50 including a second removable insert member 120. The second removable insert member 120 includes an inner surface 122 configured to be disposed generally coplanar with the defining surface 54 of the mold main body 52 and a shaped vortex generator cavity 124 having a rectangular cross section and configured to be open to the defining surface 54 of the mold main body 52. The rectangular vortex generator cavity 124 is configured to form a vortex generator defining a rectangular prism-shape. Thus, by replacing the first removable insert member 64 with the second removable insert member 120, the molding apparatus 50 may be modified for molding a wind turbine blade 22 having vortex generators 24 of any alternative shape, including but not limited to triangular prisms and rectangular prisms.

Figure 15B:
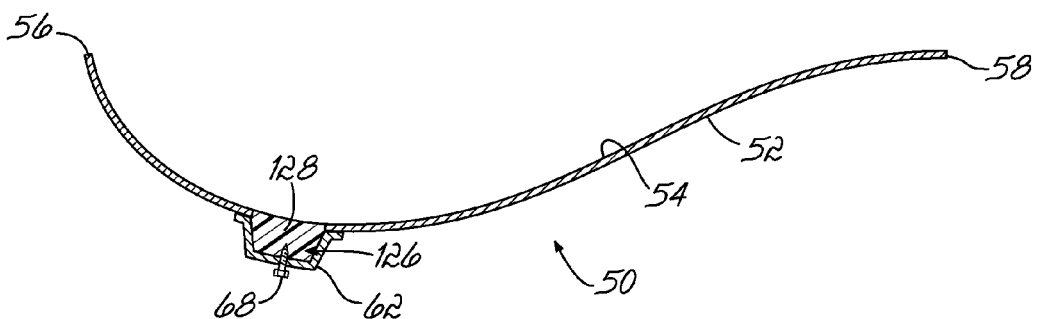
FIG. 15B is a cross-sectional side view of another embodiment of a molding apparatus used to manufacture a wind turbine blade according to the invention.

Similarly, FIG. 15B illustrates the molding apparatus 50 including a third removable insert member 126. The third removable insert member 126 includes an inner surface 128 configured to be disposed generally coplanar with the defining surface 54 of the mold main body 52. More specifically, the third removable insert member 126 does not include any vortex generator cavity in the inner surface 128 such that the defining surface 54 of the mold main body 52 and the inner surface 128 of the third removable insert member 126 approximate a conventional mold without any recessed cavities 60 or receptacles 62. Consequently, by replacing the first removable insert member 64 with the third removable insert member 126, the molding apparatus 50 may be modified for molding a wind turbine blade 22 without integral vortex generators 24. Therefore, the molding apparatus 50 and methods of manufacture are easily reconfigured for any wind turbine blade that needs to be manufactured.

The molding apparatus 50 and methods of manufacture of this invention are operable to form a wind turbine blade 22 having integral vortex generators 24 of any size and shape for a particular application. The integral vortex generators 24 are formed of two components: the structural material that at least partially defines the outer surface 34 of the wind turbine blade 22, and an inner shaped plug member 48 typically formed of plastic. As such, the resulting vortex generators 24 are robust and not subject to certain failure modes of conventional vortex generators including but not limited to ultraviolet radiation degradation and tearing off at the outer surface 34. Furthermore, the vortex generators 24 and the wind turbine blade 22 will reliably come out of the molding apparatus 50 during a demolding process without causing damage to the vortex generators 24. The wind turbine blade 22 with integral vortex generators 24 is therefore easily manufactured and advantageous compared to conventional wind turbine blades.

While the present invention has been illustrated by a description of various preferred embodiments and while these embodiments have been described in some detail, it is not the intention of the inventor to restrict or in any way limit the scope of the appended claims to such detail. Additional advantages and modifications will readily appear to those skilled in the art. For example, in alternative embodiments, the insert member may be fixedly coupled to the receptacle and not separable therefrom. Thus, the various features of the invention may be used alone or in any combination depending on the needs and preferences of the user.

What is claimed is:

1. A wind turbine blade, comprising:
    at least two outer shells defining partial portions of the wind turbine blade, wherein at least one of the outer shells includes an outer surface defined substantially in its entirety by a layer of structural material; and
    a plurality of vortex generators integrally formed in the at least one of the outer shells along the outer surface, each vortex generator including an outer first component defined by a portion of the layer of structural material and an inner second component defining the shape of the vortex generator and at least partially surrounded by the outer first component.

2. The wind turbine blade of claim 1, wherein the outer first component of each vortex generator is composed of a first material, and the inner second component of each vortex generator is composed of a second material different than the first material.

3. The wind turbine blade of claim 2, wherein the first material includes a fiber-reinforced plastic, and the second material includes a plastic material.

4. The wind turbine blade of claim 1, wherein the inner second component of the plurality of vortex generators defines a triangular prism shape including an upstream surface facing towards a leading edge of the wind turbine blade and a downstream surface facing towards a trailing edge of the wind turbine blade generally angled from the upstream surface.

5. The wind turbine blade of claim 4, wherein the triangular prism shape of each of the plurality of vortex generators defines a triangular cross section transverse to a length of each of the plurality of vortex generators, the length extending between tapered upstream and downstream ends such that the triangular cross section is largest at a center of the triangular prism shape and tapered to be smaller at the upstream and downstream ends.

6. The wind turbine blade of claim 4, wherein the wind turbine blade defines a chord length adjacent each of the plurality of vortex generators, and wherein each of the plurality of vortex generators defines a triangular cross section at a center of the triangular prism shape which defines a height extending above the outer surface of the wind turbine blade that ranges from 0.5% to 1% of the chord length adjacent that vortex generator and which defines a width extending between the upstream and downstream surfaces that ranges from 0.5% to 1% of the chord length adjacent that vortex generator, with the ratio of the height to the width being greater than or equal to 1.

7. A wind turbine comprising:
a tower;
a nacelle disposed adjacent a top of the tower; and
a rotor including a hub and a plurality of wind turbine blades according to claim 1 and extending from the hub.

8. A method of manufacturing a wind turbine blade having at least one vortex generator, the method comprising:
inserting a first removable insert member with a first vortex generator cavity into a recessed cavity of a mold main body;
disposing a first layer of structural material over the mold main body and the first removable insert member, the first layer of structural material configured to define substantially an entirety of an outer surface of an outer shell which defines a partial portion of the wind turbine blade;
pushing a shaped plug into the first vortex generator cavity of the first removable insert member to push the first layer of structural material into the first vortex generator cavity;
disposing a second layer of structural material over the mold main body, the first removable insert member, and the shaped plug to form the outer shell of the wind turbine blade with an integral vortex generator, with the vortex generator including an outer first component defined by a portion of the first layer of structural material and an inner second component defined by the shaped plug which defines the shape of the vortex generator while being at least partially surrounded by the outer first component;
demolding the outer shell of the wind turbine blade and the integral vortex generator from the mold main body and the first removable insert; and
coupling the outer shell to one or more outer shells to assemble the wind turbine blade.

9. The method of claim 8, wherein demolding the wind turbine blade and the integral vortex generator further includes demolding the wind turbine blade and the integral vortex generator simultaneously.

10. The method of claim 8, wherein demolding the wind turbine blade and the integral vortex generator further includes:
demolding the wind turbine blade from the mold main body while the first removable insert member remains coupled to the integral vortex generator; and
demolding the integral vortex generator from the first removable insert member after the wind turbine blade has been demolded from the mold main body.

11. The method of claim 10, wherein demolding the integral vortex generator from the first removable insert member includes manually peeling the first removable insert member gradually from the integral vortex generator.

12. The method of claim 8, wherein demolding the wind turbine blade and the integral vortex generator further includes:
demolding the integral vortex generator from the first removable insert member while the wind turbine blade remains coupled to the mold main body; and
demolding the wind turbine blade from the mold main body after the integral vortex generator has been demolded from the first removable insert member.

13. The method of claim 8, further comprising:
replacing the first removable insert member in the recessed cavity of the mold main body with a second removable insert member with a second vortex generator cavity having a different shape than the first vortex generator cavity such that the second removable insert member forms a second vortex generator on the wind turbine blade having a different shape.

14. The method of claim 8, further comprising:
replacing the first removable insert member in the recessed cavity of the mold main body with a third removable insert member having no vortex generator cavity such that the mold main body and the third removable insert member form a wind turbine blade including no integral vortex generators.

15. The method of claim 8, further comprising:
applying a coat of binder to the first vortex generator cavity of the first removable insert prior to disposing the first layer of structural material over the mold main body and the first removable insert member.

16. A wind turbine including a plurality of wind turbine blades including at least one integral vortex generator, wherein each of the wind turbine blades is formed by the process comprising:
inserting a first removable insert member with a first vortex generator cavity into a recessed cavity of a mold main body;
disposing a first layer of structural material over the mold main body and the first removable insert member, the first layer of structural material configured to define substantially an entirety of an outer surface of an outer shell which defines a partial portion of the wind turbine blade;
pushing a shaped plug into the first vortex generator cavity of the first removable insert member to push the first layer of structural material into the first vortex generator cavity;
disposing a second layer of structural material over the mold main body, the first removable insert member, and the shaped plug to form the outer shell of the wind turbine blade with an integral vortex generator, with the vortex generator including an outer first component defined by a portion of the first layer of structural material and an inner second component defined by the shaped plug which defines the shape of the vortex generator while being at least partially surrounded by the outer first component;
demolding the outer shell of the wind turbine blade and the integral vortex generator from the mold main body and the first removable insert; and
coupling the outer shell to one or more outer shells to assemble the wind turbine blade.

17. The wind turbine of claim 16, wherein each of the wind turbine blades includes a first plurality of integral vortex generators disposed in a first spanwise row and a second plurality of integral vortex generators disposed in a second spanwise row.

18. The wind turbine of claim 17, wherein the first plurality of integral vortex generators include pairs of vortex generators spaced from one another and angled to define a V-shaped vortex generator formation with an apex of the V-shaped vortex generator V shape directed in an upstream direction.

19. The wind turbine of claim 18, wherein each of the first plurality of integral vortex generators defines a triangular prism shape including an upstream surface facing towards a leading edge of the wind turbine blade and a downstream surface facing towards a trailing edge of the wind turbine blade and generally angled from the upstream surface.

20. The wind turbine of claim 19, wherein the triangular prism shape of each of the first plurality of integral vortex generators defines a triangular cross section transverse to a length of each of the first plurality of integral vortex generators, the length extending between tapered upstream and downstream ends such that the triangular cross section is largest at a center of the triangular prism shape and tapered to be smaller at the upstream and downstream ends.

21. The wind turbine of claim 19, wherein the wind turbine blade defines a chord length adjacent each of the first plurality of integral vortex generators, and wherein each of the first plurality of integral vortex generators defines a triangular cross section at a center of the triangular prism shape which defines a height extending above the outer surface of the wind turbine blade that ranges from 0.5% to 1% of the chord length adjacent that integral vortex generator and which defines a width extending between the upstream and downstream surfaces that ranges from 0.5% to 1% of the chord length adjacent that integral vortex generator, with the ratio of the height to the width being greater than or equal to 1.

* * * * *

UNITED STATES PATENT AND TRADEMARK OFFICE
CERTIFICATE OF CORRECTION

PATENT NO. : 9,039,381 B2  
APPLICATION NO. : 13/313609  
DATED : May 26, 2015  
INVENTOR(S) : Ronald Grife et al.

Page 1 of 1

It is certified that error appears in the above-identified patent and that said Letters Patent is hereby corrected as shown below:

IN THE CLAIMS

At column 14, claim number 18, line number 65, after "generator" delete "V shape"

Signed and Sealed this  
Sixth Day of October, 2015

Michelle K. Lee  
*Director of the United States Patent and Trademark Office*